US012679658B2

(12) United States Patent
Shang et al.

(10) Patent No.: US 12,679,658 B2
(45) Date of Patent: Jul. 14, 2026

(54) FLEXIBLE ROLLING BELT-BASED CONVEYING APPARATUS

(71) Applicant: SUZHOU PAIRS KEE AUTOMATION EQUIPMENT CO., LTD., Suzhou (CN)

(72) Inventors: Jitong Shang, Taian (CN); Ce Wang, Taian (CN)

(73) Assignee: SUZHOU PAIRS KEE AUTOMATION EQUIPMENT CO., LTD., Suzhou (CN)

( * ) Notice: Subject to any disclaimer, the term of this patent is extended or adjusted under 35 U.S.C. 154(b) by 0 days.

(21) Appl. No.: 19/144,471

(22) PCT Filed: Oct. 12, 2024

(86) PCT No.: PCT/CN2024/124320
§ 371 (c)(1),
(2) Date: Jun. 28, 2025

(87) PCT Pub. No.: WO2025/092395
PCT Pub. Date: May 8, 2025

(65) Prior Publication Data
US 2026/0116666 A1 Apr. 30, 2026

(30) Foreign Application Priority Data
Nov. 1, 2023 (CN) ......................... 202311438989.X

(51) Int. Cl.
*B65G 13/12* (2006.01)
(52) U.S. Cl.
CPC ................................... *B65G 13/12* (2013.01)
(58) Field of Classification Search
CPC ...................................................... B65G 13/12
See application file for complete search history.

(56) References Cited

U.S. PATENT DOCUMENTS 1,650,037 A * 11/1927 Phillips .................. B65G 13/12
198/787
2,307,389 A * 1/1943 Carter .................... B65G 13/12
193/35 F
(Continued)

FOREIGN PATENT DOCUMENTS

CN 1207163 A * 2/1999 ............. F16G 13/16
CN 109969734 A * 7/2019 ........... B65G 41/008
(Continued)

OTHER PUBLICATIONS

International search report of PCT/CN2024/124320.
(Continued)

*Primary Examiner* — Gene O Crawford
*Assistant Examiner* — Abby A Jorgensen
(74) *Attorney, Agent, or Firm* — Hemisphere Law, PLLC

(57) ABSTRACT

A flexible rolling belt-based conveying apparatus is provided, including a plurality of rolling body units. Each rolling body unit includes a support. A power roller is arranged above the support. Locomotion wheels are arranged on two sides of the support. A chain link unit is arranged in the middle of the support. A guide wheel is mounted below the chain link unit. The chain link unit includes a main chain link and an auxiliary chain link. The main chain link and the auxiliary chain link are hinged respectively through a longitudinal hinge shaft and a transverse hinge shaft. The longitudinal and transverse hinge shafts form a crisscross structure, and are in no contact at a center of the crisscross structure. The plurality of rolling body units are sequentially connected front and back through the chain link units. The rolling body units can rotate in a horizontal direction and a vertical direction to form a continuous flexible conveying rolling belt.

8 Claims, 13 Drawing Sheets

(56)          References Cited

U.S. PATENT DOCUMENTS

| 2,494,302 A | * | 1/1950 | Mason | B65G 13/12 |
| | | | | 193/35 F |
| 5,839,476 A | * | 11/1998 | Blase | H02G 11/006 |
| | | | | 138/120 |
| 7,261,202 B1 | * | 8/2007 | Canapa | B65G 67/08 |
| | | | | 414/346 |
| 7,398,876 B2 | * | 7/2008 | Vestergaard | B65G 13/04 |
| | | | | 193/35 F |

FOREIGN PATENT DOCUMENTS

| CN | 109969734 Y | | 7/2019 | | |
| CN | 110155612 A | * | 8/2019 | | B65G 17/38 |
| CN | 117163549 | | 12/2023 | | |
| WO | WO-2006074659 A1 | * | 7/2006 | | B65G 13/12 |
| WO | WO-2022254031 A1 | * | 12/2022 | | B65G 21/14 |

OTHER PUBLICATIONS

CNIPA, Notification of First Office Action for Chinese application CN202311438989.X, Dec. 9, 2023.

CNIPA, Notification to grant patent right for Chinese application CN202311438989.X, Jan. 4, 2024.

\* cited by examiner

FLEXIBLE ROLLING BELT-BASED CONVEYING APPARATUS

TECHNICAL FIELD

The present disclosure belongs to the technical field of conveying apparatuses, and in particular, to a flexible rolling belt-based conveying apparatus.

BACKGROUND

For a variety of reasons, especially in a narrow space, it is very hard to load and unload goods, luggage, and packages. Removers usually have to bend down or fall on their knees for long time to repeatedly transfer goods, luggage, and packages from a conveyor to a warehousing facility in such an extremely uncomfortable condition, and vice versa. In the long run, the loading and unloading efficiency is low, and the knees and waists of the removers are also severely damaged.

Chinese patent CN109969734A discloses a retractable flexible conveying device, which is mounted on a luggage car and includes a stand, a bottom plate, a main conveying unit, a retraction mechanism, a flexible rolling type conveying device, a head conveying unit, and a lapping plate. This patent can meet requirements for different directions and different heights in a luggage conveying process. However, in the flexible rolling type conveying device, a rear end of each intermediate connector is connected to a front end of a fixed connector of a bracket through a bolt, and a front end of the intermediate connector is connected to a rear end of the fixed connector of the bracket through a pin, so that the flexible rolling type conveying device has a long chain link unit and a large turning radius, and cannot implement transportation under complicated working conditions such as small-scale warehousing and a narrow transfer space. Furthermore, a distance between two adjacent power rollers is large, so that it is easy for an item to get stuck during transportation at a corner, and this affects the steadiness and smoothness of transportation.

SUMMARY

The present disclosure aims to solve at least one technical problem in the background section, and provides a flexible rolling belt-based conveying apparatus, which can rotate in both a horizontal direction and a vertical direction and implement continuous conveying of goods, luggage, and packages between a conveyor and a warehousing facility, thereby improving loading and unloading efficiency and avoiding accident work injuries. Furthermore, thanks to short chain link units, a small turning radius, and a short distance between two adjacent power rollers, the flexible rolling belt-based conveying apparatus can adapt to complicated warehousing and transportation working conditions such as small-scale warehousing and a narrow transfer space; malfunctions such as an item getting stuck and equipment being damaged do not easily occur; and transportation is more stable and reliable.

In order to achieve the above objective, the present disclosure adopts the following technical solutions:

A flexible rolling belt-based conveying apparatus includes a plurality of rolling body units. Each rolling body unit includes a support; a power roller is arranged above the support; locomotion wheels are arranged on two sides of the support; a chain link unit is arranged in the middle of the support; a guide wheel is mounted below the chain link unit;

the plurality of rolling body units are sequentially connected front and back through the chain link units; and the rolling body units can rotate in a horizontal direction and a vertical direction to form a continuous flexible conveying rolling belt.

Each chain link unit includes a main chain link and an auxiliary chain link; a horizontal convex lug is arranged in the middle of a front end of the main chain link; a main longitudinal hinge hole is longitudinally provided in the horizontal convex lug; vertical convex lugs are arranged on two sides of a rear end of the main chain link; and main transverse hinge holes are horizontally provided in the vertical convex lugs.

An auxiliary longitudinal hinge hole that is adapted to the main longitudinal hinge hole and auxiliary transverse hinge holes that are adapted to the main transverse hinge holes are provided in the auxiliary chain link. The auxiliary longitudinal hinge hole and the auxiliary transverse hinge holes are arranged in the same plane.

The main longitudinal hinge hole and the auxiliary longitudinal hinge hole are hinged through a longitudinal hinge shaft, and the main transverse hinge holes and the auxiliary transverse hinge holes are hinged through a transverse hinge shaft; and the transverse hinge shaft and the longitudinal hinge shaft form a crosswise structure and are in no contact at a center of the crosswise structure.

Further, a limiting slot structure is further arranged on the main chain link of each chain link unit. The limiting slot structure includes a transverse limiting slot arranged behind the main longitudinal hinge hole, and longitudinal limiting slots arranged in front of the main transverse hinge holes.

A limiting hole structure corresponding to the limiting slot structure is arranged on the auxiliary chain link. The limiting hole structure includes a transverse limiting hole arranged behind the auxiliary longitudinal hinge hole, and longitudinal limiting holes arranged in front of the auxiliary transverse hinge holes.

The transverse limiting slot and the transverse limiting hole are connected through a longitudinal limiting pin for horizontal transverse limitation. The longitudinal limiting slots and the longitudinal limiting holes are connected through a transverse limiting pin for vertical longitudinal limitation.

Still further, the transverse limiting slot and the longitudinal limiting slots are both fan-shaped through slots.

Further, anti-tilting wheels are arranged in a front-back staggered manner below the chain link units.

Further, each transverse hinge shaft includes two short transverse shafts, and each longitudinal hinge shaft penetrates through each chain link unit from top to bottom; and the guide wheel is arranged at a bottom of the longitudinal hinge shaft.

Further, each support is formed by combining two half supports; one end of each half support of the support is fixedly connected to the main chain link of each chain link unit through a first side connecting plate, and another end is connected with a side protective cover through a second side connecting plate; and the locomotion wheels are mounted on an inner side of a bottom of the second side connecting plate.

Still further, the left and right first side connecting plates of the support are diagonally opposite to each other, one behind another; and anti-tilting wheels are arranged on outer sides of bottoms of the first side connecting plates, so that the two anti-tilting wheels are arranged in a front-back staggered manner below the chain link units.

Further, a surface of each power roller is coated with rubber, and the power roller is of a conical structure having large diameters in two ends and a small diameter in the middle.

Further, the guide wheels are provided with vertical U-shaped guide rails in a matched manner.

Still further, the locomotion wheels are provided with horizontal U-shaped guide rails in a matched manner.

Compared with the prior art, the present disclosure has the beneficial effects below:

(1) By the chain link units of the present disclosure, the auxiliary longitudinal hinge holes and the auxiliary transverse hinge holes are arranged on the same plane, and the transverse hinge shafts and the longitudinal hinge shafts form the crosswise structures and are in no contact at the centers of the crosswise structures. Through the above structural design, when the chain link units of the present disclosure are connected in series, the entire apparatus can rotate in an angle in both the horizontal direction and the vertical direction, to continuously convey goods, luggage, and packages between a conveyor and a warehousing facility, thereby improving loading and unloading efficiency and avoiding accident work injuries. Meanwhile, compared with the patent No. CN109969734A in the prior art, the hinge shafts of the chain link units of the present disclosure in two directions are crossed, are in no contact at the centers, and are arranged on the same plane, so that the chain link units are shorter, a turning radius is smaller, and transportation requirements of more complicated working conditions such as small-scale warehousing and a narrow transfer space can be met. Furthermore, the chain link units are shorter, and a distance between two adjacent power rollers is smaller, so that it is not easy for an item to get stuck at a turning place, and transportation is more stable, smoother, and more reliable.

(2) The chain link units of the present disclosure are provided with the fan-shaped limiting slot structures, so that rotation of the flexible rolling belt-based conveying apparatus can be limited in the horizontal and vertical directions. This effectively avoids a situation that an item gets stuck, transportation stops, or equipment is damaged because of a long distance between two adjacent power rollers, i.e. front and rear power rollers, at a turning place, to ensure that the transportation is more stable, smoother, and more reliable. Meanwhile, specific limiting angles of the fan-shaped limiting slot structures in the two directions can be set as required, so that the limitation is precise and controllable. This can further ensure the reliability of transportation of the apparatus.

(3) In the apparatus of the present disclosure, the anti-tilting wheels are arranged in the staggered manner below the chain link units. When the plurality of chain link units are sequentially connected one behind another, the two staggered anti-tilting wheels of the chain link unit located in a middle section and the anti-tilting wheels of the chain link units adjacent to the chain link unit form four anti-tilting wheels, so that there are four anti-tilting wheel supporting points at a bottom of the chain link unit located in the middle section. During transportation, this can effectively avoid tipping over of the plurality of rolling body units under an external force, and the stability and reliability of transportation are further ensured.

Figure 1:
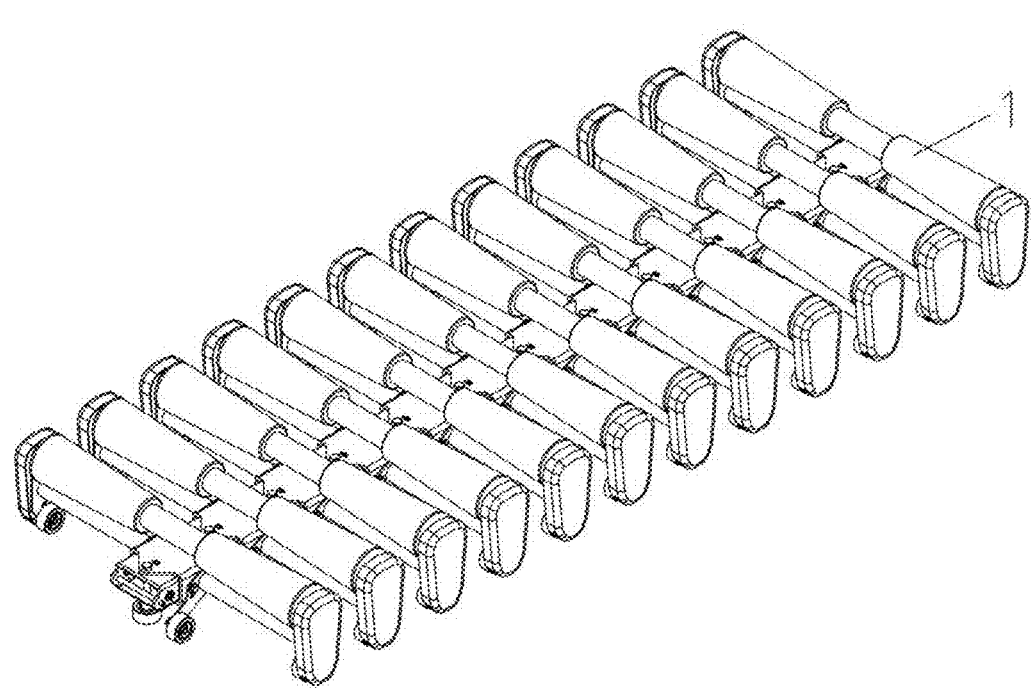
FIG. 1 is a schematic structural diagram of a flexible rolling belt-based conveying apparatus according to an embodiment of the present disclosure.
Figure 2:
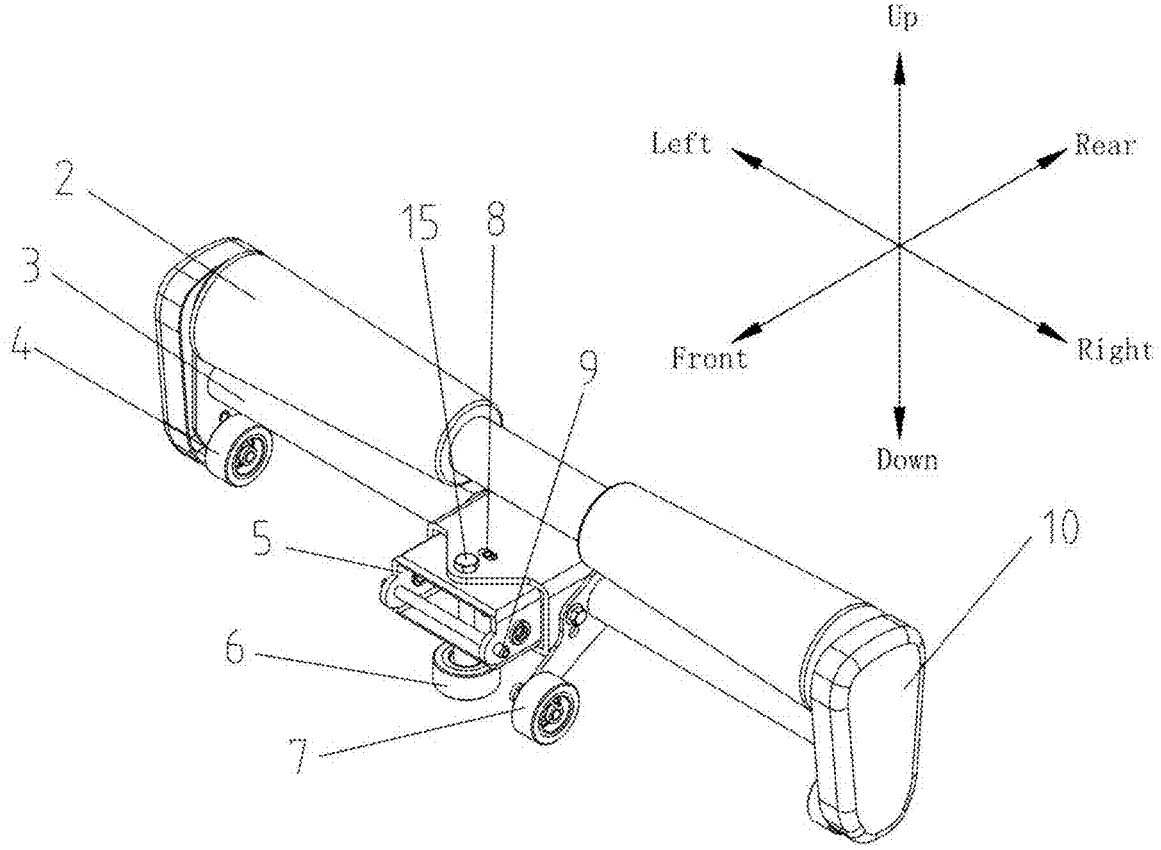
FIG. 2 is a schematic structural diagram of a rolling body unit according to an embodiment of the present disclosure.

Numerals in the drawings: 1: rolling body unit; 2: power roller; 3: support; 301: first side connecting plate; 302: second side connecting plate; 4: locomotion wheels; 5: chain link unit; 6: guide wheel; 7: anti-tilting wheel; 8: longitudinal limiting pin; 9: transverse limiting pin; 10: side protective cover; 11: main chain link; 1101: main longitudinal hinge hole; 1102: transverse limiting slot; 1103: main transverse hinge hole; 1104: longitudinal limiting slot; 12: auxiliary chain link; 1201: auxiliary longitudinal hinge hole; 1202: transverse limiting hole; 1203: auxiliary transverse hinge hole; 1204: longitudinal limiting hole; 1301: vertical U-shaped guide rail; 1302: horizontal U-shaped guide rail; 14: transverse hinge shaft; and 15: longitudinal hinge shaft.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of present disclosure without making creative efforts shall fall within the protection scope of present disclosure.

In the description of the present disclosure, it should be understood that orientations or positional relationships indicated by the terms "coaxial, "bottom", "one end", "top", "middle", "the other end", "upper", "one side", "top", "inner", "front", "center", "two ends", and the like are orientations or positional relationships as shown in the drawings, and are only for the purpose of facilitating and simplifying the description of the present disclosure instead of indicating or implying that devices or elements indicated need to have particular orientations, and be constructed and operated in the particular orientations, so that these terms are not construed as limiting the present disclosure.

In the present application, unless otherwise expressly specified and limited, the terms "mount", "arrange", "connection", "fix", "rotation", and the like should be understood in a broad sense, such as, a fixed connection, a detachable connection, an integrated connection, a mechanical connection, an electrical connection, a direct connection, an indirect connection through an intermediate medium, an internal communication between two elements, or interaction between two elements, unless expressly specified otherwise. Those of ordinary skill in the art can understand the specific meanings of the above terms in the present disclosure according to specific situations.

Embodiment 1

As shown in FIG. 1 to FIG. 13, an embodiment of the present disclosure provides a flexible rolling belt-based conveying apparatus, including a plurality of rolling body units. Referring to FIG. 1, each rolling body unit includes a support 3. A power roller 2 is arranged above the support 3. Locomotion wheels 4 that play a role of walking and supporting are arranged on two sides of the support 3. A chain link unit 5 is arranged in the middle of the support 3. A guide wheel 6 is mounted below the chain link unit 5. The plurality of rolling body units are sequentially connected front and back through the chain link units 5. The rolling body units can rotate in a horizontal direction and a vertical direction to form a continuous flexible conveying rolling belt.

Figure 4:
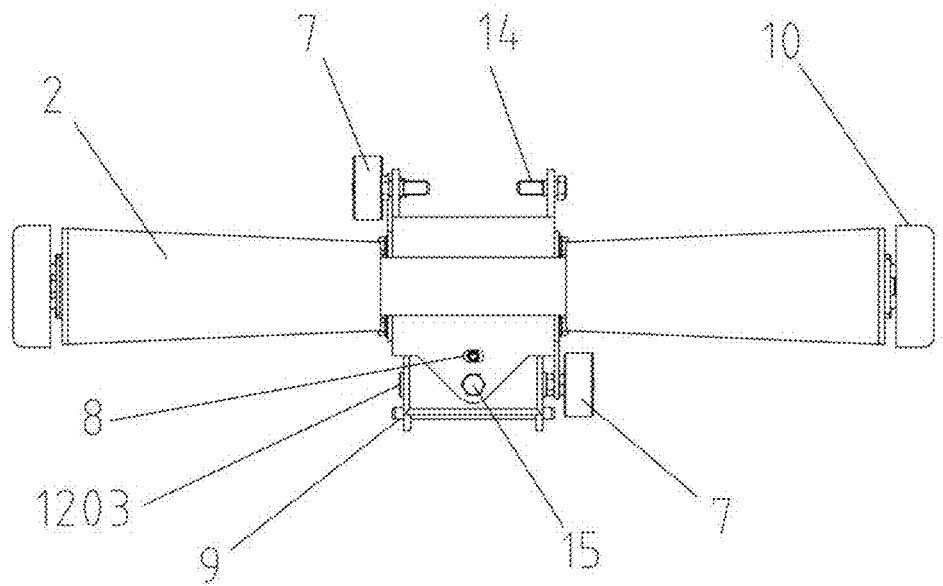
FIG. 4 is a top view of a rolling body unit according to an embodiment of the present disclosure.
Figure 5:
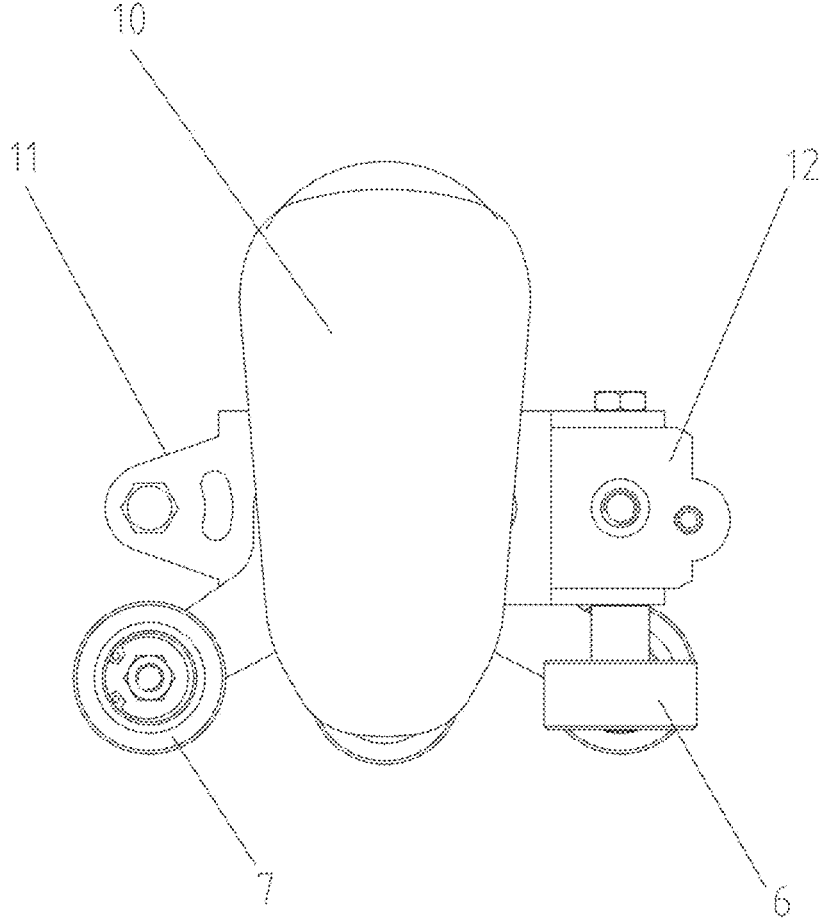
FIG. 5 is a left view of a rolling body unit according to an embodiment of the present disclosure.
Figure 6:
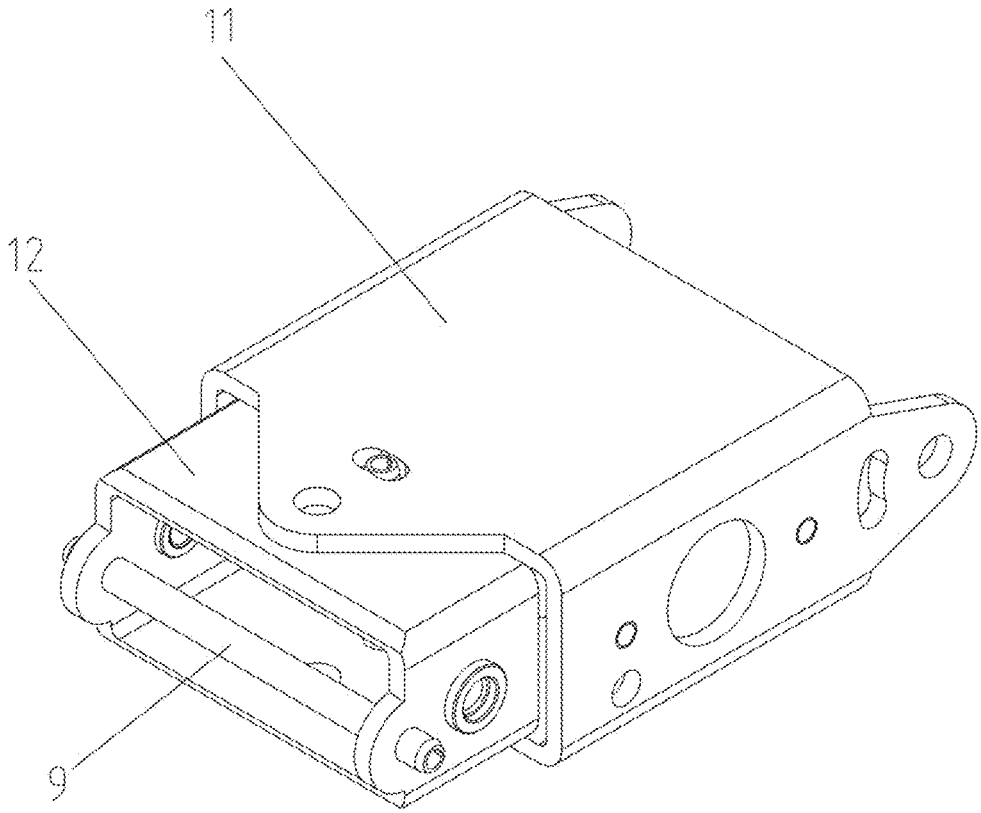
FIG. 6 is a schematic structural diagram of a chain link unit according to an embodiment of the present disclosure.
Figure 7:
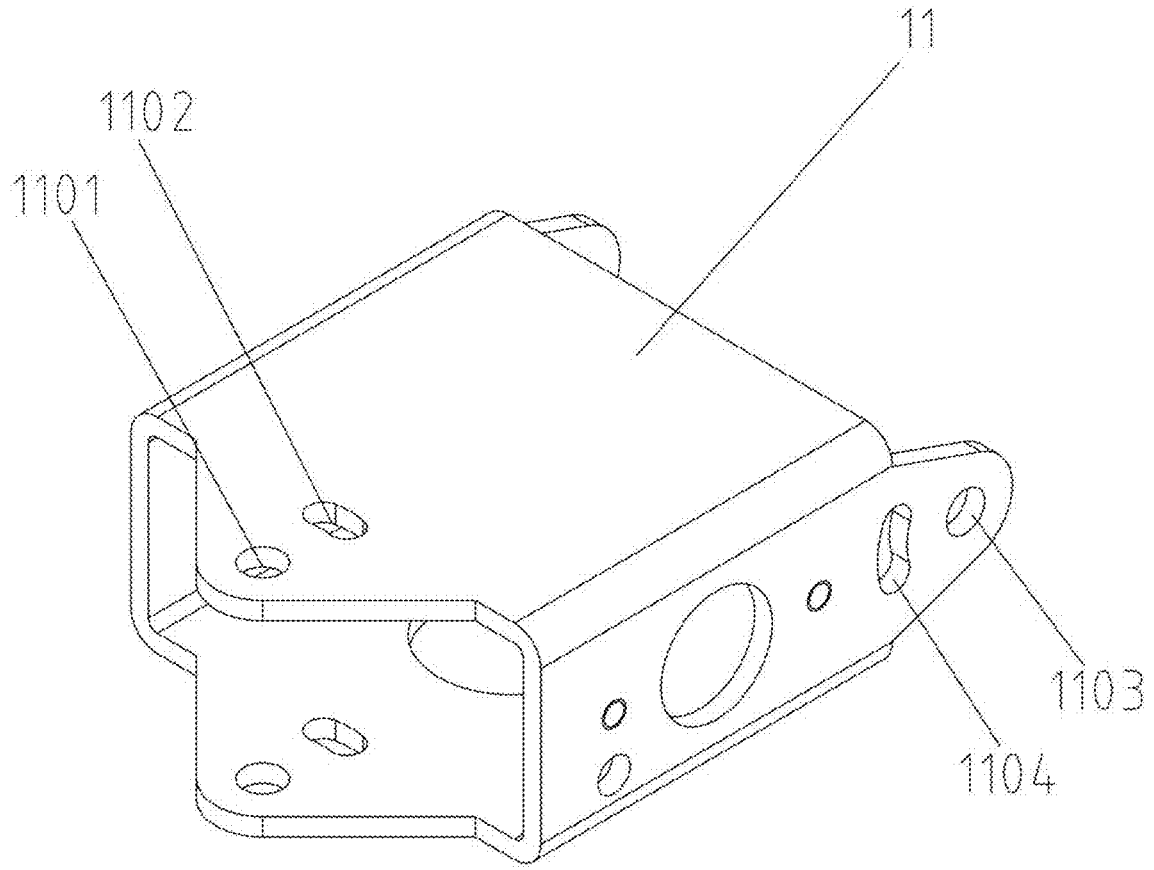
FIG. 7 is a schematic structural diagram of a main chain link according to an embodiment of the present disclosure.
Figure 8:
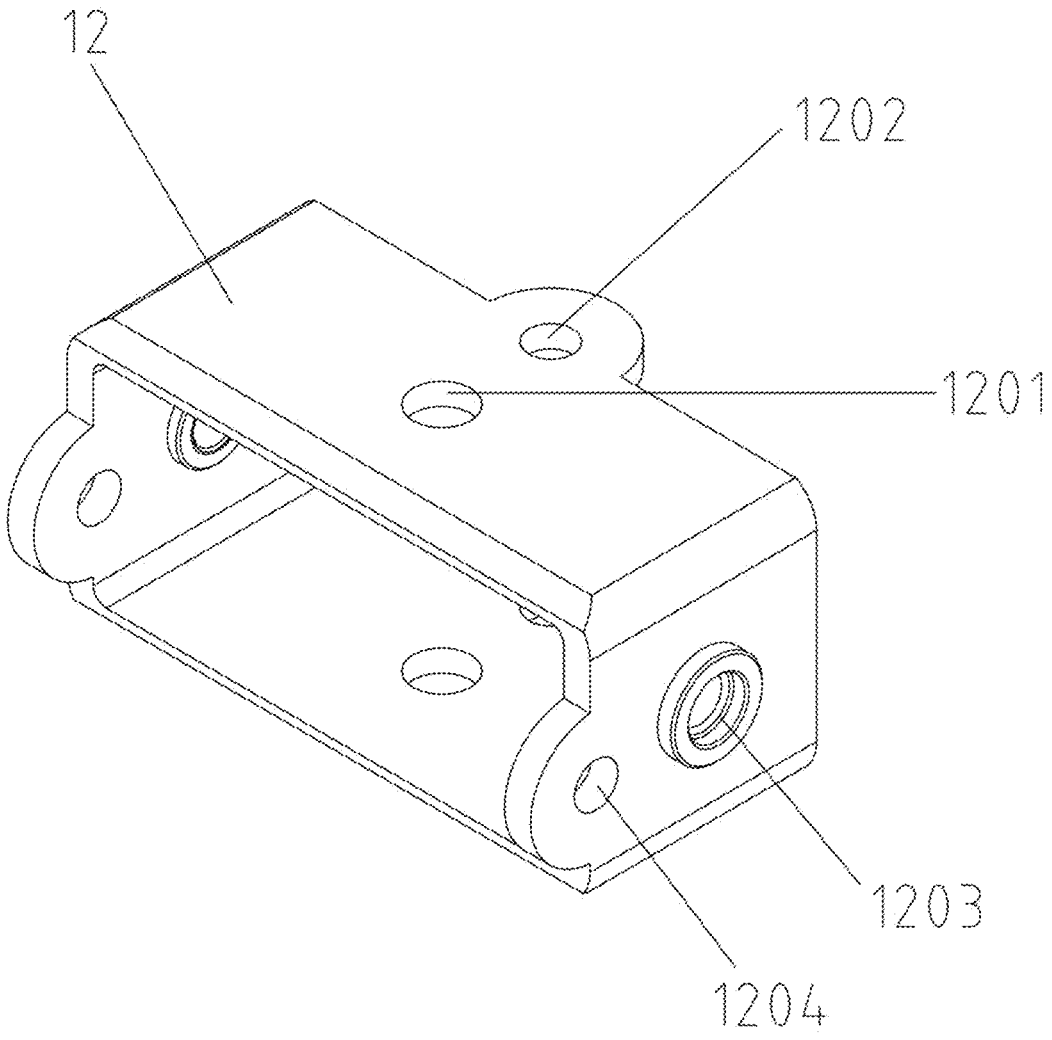
FIG. 8 is a schematic structural diagram of an auxiliary chain link according to an embodiment of the present disclosure.

As shown in FIG. 6 to FIG. 8, each chain link unit 5 includes a main chain link 11 and an auxiliary chain link 12. A horizontal convex lug is arranged in the middle of a front end of the main chain link 11. A main longitudinal hinge hole 1101 is longitudinally provided in the horizontal convex lug. Vertical convex lugs are arranged on two sides of a rear end of the main chain link 11. Main transverse hinge holes 1103 are horizontally provided in the vertical convex lugs. An auxiliary longitudinal hinge hole 1201 that is adapted to the main longitudinal hinge hole 1101 and auxiliary transverse hinge holes 1203 that are adapted to the main transverse hinge holes 1103 are provided in the auxiliary chain link 12. As shown in FIG. 4 and FIG. 6, the auxiliary longitudinal hinge hole 1201 and the auxiliary transverse hinge holes 1203 are arranged in the same plane. The main longitudinal hinge hole 1101 and the auxiliary longitudinal hinge hole 1201 are hinged through a longitudinal hinge shaft 15, and the main transverse hinge holes 1103 and the auxiliary transverse hinge holes 1203 are hinged through a transverse hinge shaft 14. The transverse hinge shaft 14 and the longitudinal hinge shaft 15 form a crosswise structure and are in no contact at a center of the crosswise structure. Specifically, one of the longitudinal and transverse hinge shafts is formed by hinging two short shafts, or each of the longitudinal and transverse hinge shafts is formed by hinging two short shafts. In this embodiment of the present disclosure, each transverse hinge shaft 14 includes two short transverse shafts, and each longitudinal hinge shaft 15 penetrates through each chain link unit 5 from top to bottom. Meanwhile, the guide wheel 6 is arranged at a bottom of the longitudinal hinge shaft 15 to cooperate with a matching vertical U-shaped guide rail 1301 for positioning and guidance during conveying.

Figure 3:
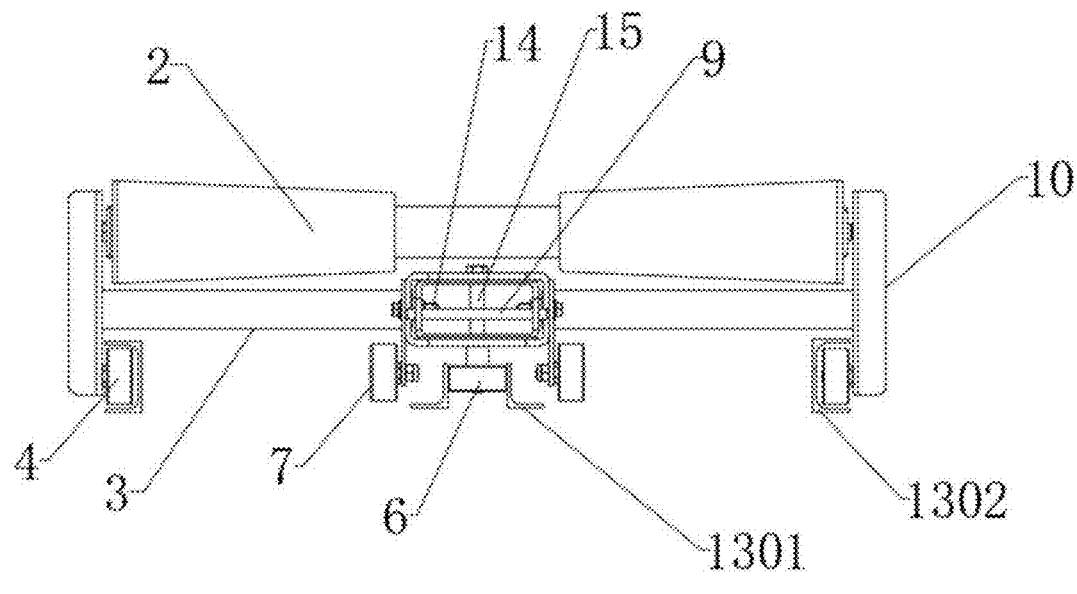
FIG. 3 is a front view of a rolling body unit according to an embodiment of the present disclosure.

According to this embodiment of the present disclosure, the auxiliary longitudinal hinge holes 1201 and the auxiliary transverse hinge holes 1203 are arranged on the same plane, and the transverse hinge shafts 14 and the longitudinal hinge shafts 15 form the crosswise structures and are in no contact at the centers of the crosswise structures. Through the above structural design, the chain link units of the present disclosure have the following beneficial effects:

(1) When the chain link units of the present disclosure are connected in series, the auxiliary chain links 12 coplanar with the hinge shafts are used as a rotation plane (referring to FIG. 6 and FIG. 3). A front main chain link 11 can rotate up and down around the transverse hinge shaft 14, and a rear main chain link 11 can rotate left and right around the longitudinal hinge shaft 15 in the horizontal direction. Therefore, the entire apparatus can rotate in an angle in both the horizontal direction and the vertical direction (referring to FIG. 12 and FIG. 13), to continuously convey goods, luggage, and packages between a conveyor and a warehousing facility, thereby improving loading and unloading efficiency and avoiding accident work injuries.

(2) Compared with the patent No. CN109969734A in the prior art, the hinge shafts of the chain link units of the present disclosure in two directions are crossed, are in no contact at the centers, and are arranged on the same plane, so that the chain link units are shorter, a turning radius is smaller, and transportation requirements of more complicated working conditions such as small-scale warehousing and a narrow transfer space can be met.

(3) Compared with the patent No. CN109969734A in the prior art, the hinge shafts of the chain link units of the present disclosure in two directions are crossed, are in no contact at the centers, and are arranged on the same plane, so that the chain link units are shorter, and a distance between two adjacent power rollers is smaller. It is not easy for an item to get stuck at a corner place, and transportation is more stable, smoother, and more reliable.

Figure 9:
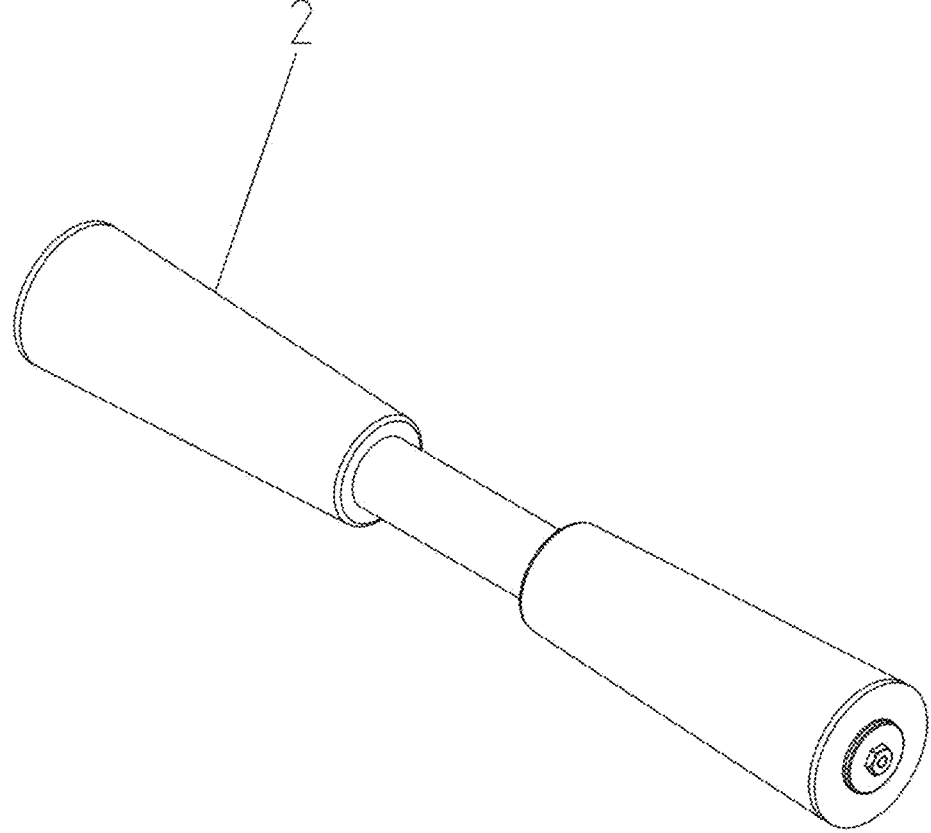
FIG. 9 is a schematic structural diagram of a power roller according to an embodiment of the present disclosure.

In this embodiment of the present disclosure, as shown in FIG. 9, a surface of each power roller 2 is coated with rubber, and the power roller 2 is of a conical structure having large diameters in two ends and a small diameter in the middle. The purpose is to effectively prevent goods, luggage, packages, and the like from sliding out of the rolling belt at a turn of the flexible rolling belt-based conveying apparatus due to a centrifugal force and ensure reliable transportation.

Figure 10:
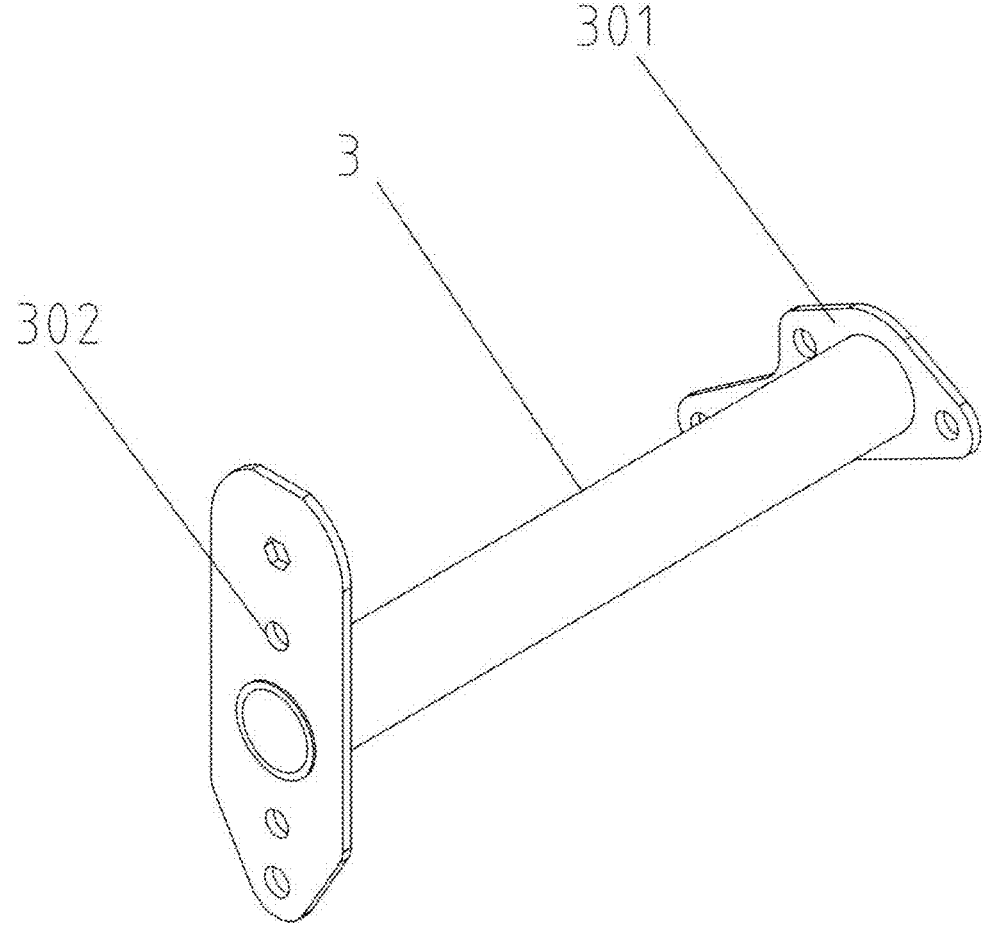
FIG. 10 is a schematic structural diagram of a support according to an embodiment of the present disclosure.

In this embodiment of the present disclosure, as shown in FIG. 10, each support 3 is formed by combining two half supports. One end of each half support of the support 3 is fixedly connected to the main chain links 11 of the chain link units 5 through a first side connecting plate 301, and another end is connected with a side protective cover 10 through a second side connecting plate 302. The locomotion wheels 4 are mounted on an inner side of a bottom of the second side connecting plate 302.

As shown in FIG. 3, in some other embodiments, in addition to the arrangement of the vertical U-shaped guide rails 1301 that cooperate with the guide wheels 6, matching horizontal U-shaped guide rails 1302 are also arranged for the locomotion wheels 4. This setting has the purpose: The guide wheels 6 and the vertical U-shaped guide rails 1301 cooperate with each other to mainly implement left-right positioning in the horizontal direction, and the locomotion wheels 4 and the horizontal U-shaped guide rails 1302 cooperate with each other to mainly implement up-down positioning in the vertical direction. The guide rails for positioning and guidance in the two directions can further ensure the stability of transportation and reliability of conveying of the apparatus in any rotation angle, in the horizontal direction and the vertical direction.

Embodiment 2

According to this embodiment of the present disclosure, based on Embodiment 1, the following improvements are made:

As shown in FIG. 6 to FIG. 8, a limiting slot structure is further arranged on the main chain link 11 of each chain link unit 5. The limiting slot structure includes a transverse limiting slot 1102 arranged behind the main longitudinal hinge hole 1101, and longitudinal limiting slots 1104 arranged in front of the main transverse hinge holes 1103. The transverse limiting slot 1102 and the longitudinal limiting slots 1104 are both fan-shaped through slots. An angle of each fan-shaped through slot is specifically set as required.

A limiting hole structure corresponding to the limiting slot structure is arranged on the auxiliary chain link 12. The limiting hole structure includes a transverse limiting hole 1202 arranged behind the auxiliary longitudinal hinge hole 1201, and longitudinal limiting holes 1204 arranged in front of the auxiliary transverse hinge holes 1203.

The transverse limiting slot 1102 and the transverse limiting hole 1202 are connected through a longitudinal limiting pin 8 (referring to FIG. 2) for horizontal transverse limitation, to limit a rotation angle of the rear main chain link 11 that rotates left and right (referring to FIG. 4) around the longitudinal hinge shaft 15 in the horizontal direction. The longitudinal limiting slots 1104 and the longitudinal limiting holes 1204 are connected through a transverse limiting pin 9 for vertical longitudinal limitation, to limit a rotation angle of the front main chain link 11 that rotates up and down (referring to FIG. 3 or FIG. 6) around the transverse hinge shaft 14 in the vertical direction.

According to this embodiment of the present disclosure, by the arrangement of the fan-shaped limiting slot structures, rotation of the flexible rolling belt-based conveying apparatus can be limited in the horizontal and vertical directions. This can avoid a situation that an item gets stuck, transportation stops, or equipment is damaged because of a long distance between two adjacent power rollers, i.e., front and rear power rollers, at a turning place, to ensure that the transportation is more stable, smoother, and more reliable. Meanwhile, specific limiting angles of the fan-shaped limiting slot structures in the two directions can be set as required, so that the limitation is precise and controllable. This can further ensure the reliability of transportation of the apparatus.

Embodiment 3

According to this embodiment of the present disclosure, based on Embodiment 1 or 2, the following improvements are made:

As shown in FIG. 1 to FIG. 5 and FIG. 10, anti-tilting wheels 7 are arranged in a front-back staggered manner below the chain link units 5.

Specifically, each support 3 is formed by combining two half supports. One end of each half support of the support 3 is fixedly connected to the main chain link 11 of each chain link unit 5 through a first side connecting plate 301, and another end is connected with a side protective cover 10 through a second side connecting plate 302. The locomotion wheels 4 are mounted on an inner side of a bottom of the second side connecting plate 302. The left and right first side connecting plates 301 of the support 3 are diagonally opposite to each other, one behind another; and anti-tilting wheels 7 are arranged on outer sides of bottoms of the first side connecting plates 301, so that the two anti-tilting wheels 7 are arranged in a front-back staggered manner below the chain link units 5.

Figure 11:
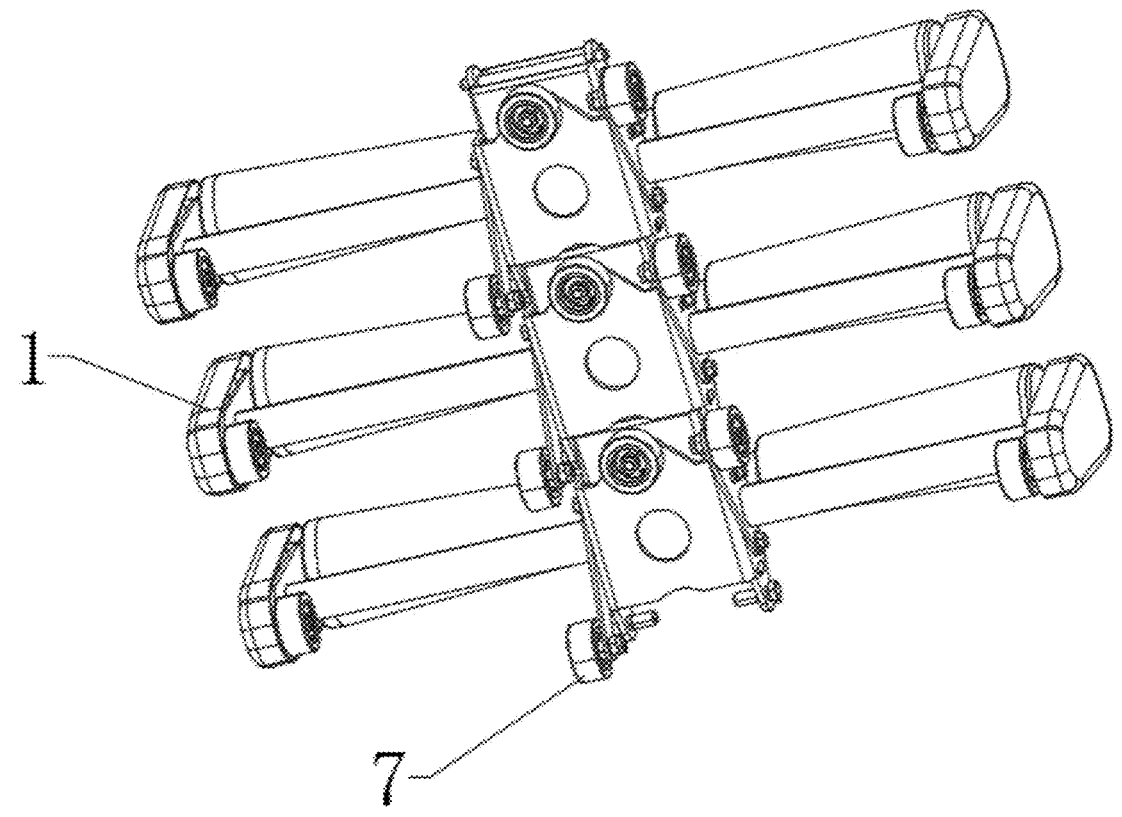
FIG. 11 is a bottom view of a plurality of rolling body units being connected according to an embodiment of the present disclosure.
Figure 12:
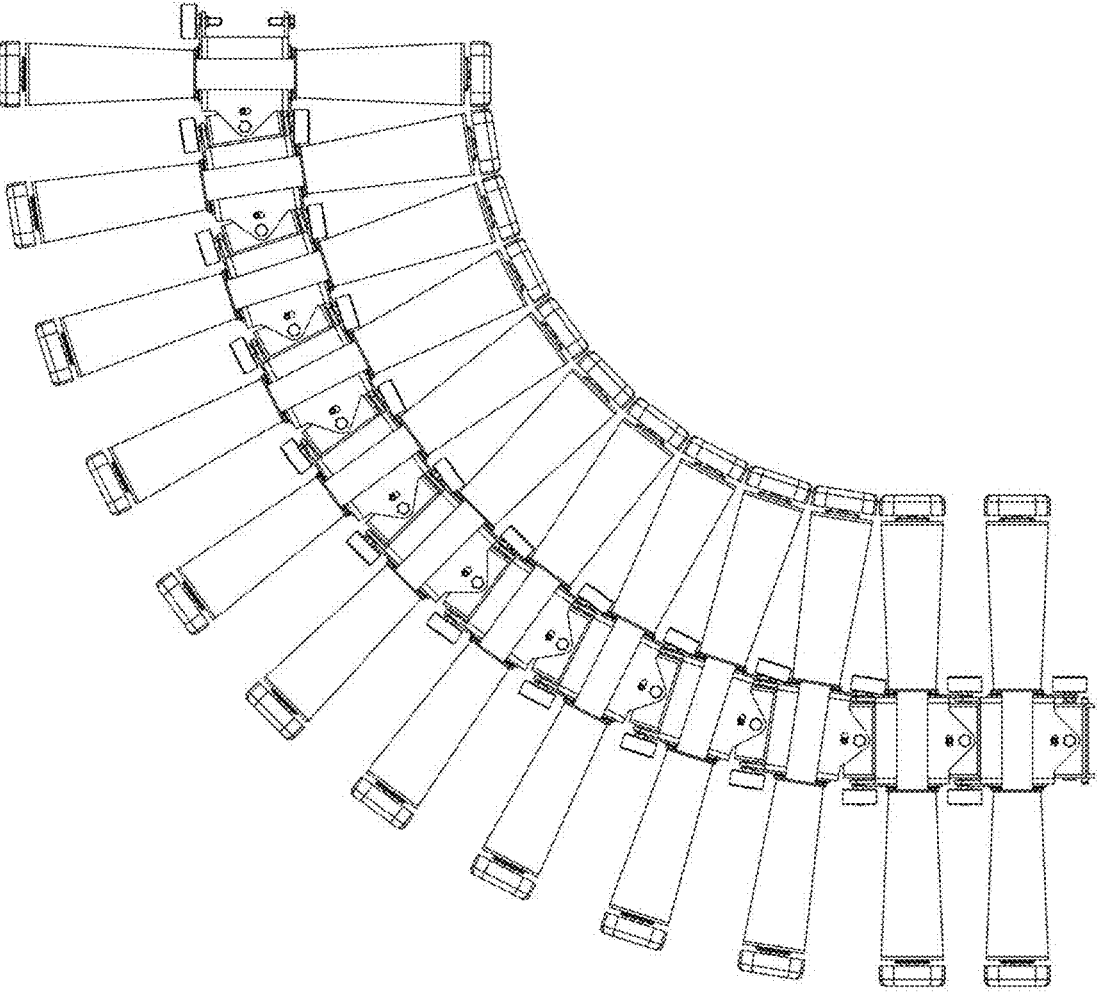
FIG. 12 is a schematic structural diagram of a flexible rolling belt-based conveying apparatus in horizontal rotation according to an embodiment of the present disclosure.
Figure 13:
FIG. 13 is a schematic structural diagram of a flexible rolling belt-based conveying apparatus in longitudinal rotation according to an embodiment of the present disclosure.

This setting has the purpose: As shown in FIG. 11, the anti-tilting wheels 7 are arranged in the front-back staggered manner below the chain link units 5. When the plurality of chain link units 5 are sequentially connected one behind another, the two staggered anti-tilting wheels 7 of the chain link unit 5 located in a middle section and the anti-tilting wheels 7 of the chain link units 5 adjacent to the chain link unit 5 form four anti-tilting wheels 4, so that there are four anti-tilting wheel supporting points at a bottom of the chain link unit 5 located in the middle section. During transportation, this can effectively avoid tipping over of the plurality of rolling body units under an external force, and the stability and reliability of transportation are further ensured.

The above descriptions are merely the embodiments of the present disclosure and are not intended to limit the present disclosure. Any modification, equivalent replacement, and improvement made within the application scope of the present disclosure shall fall within the protection scope of the present disclosure.

What is claimed is:

1. A flexible rolling belt-based conveying apparatus, comprising a plurality of rolling body units, wherein each rolling body unit comprises a support; a power roller is arranged above the support; locomotion wheels are arranged on two sides of the support; a chain link unit is arranged in the middle of the support; a guide wheel is mounted below the chain link unit; the plurality of rolling body units are sequentially connected front and back through the chain link units; the rolling body units are able to rotate in a horizontal direction and a vertical direction to form a continuous flexible conveying rolling belt;

each chain link unit comprises a main chain link and an auxiliary chain link; a horizontal convex lug is arranged in the middle of a front end of the main chain link; a main longitudinal hinge hole is longitudinally provided in the horizontal convex lug; vertical convex lugs are arranged on two sides of a rear end of the main chain link; main transverse hinge holes are horizontally provided in the vertical convex lugs;

an auxiliary longitudinal hinge hole that is adapted to the main longitudinal hinge hole and auxiliary transverse hinge holes that are adapted to the main transverse hinge holes are provided in the auxiliary chain link; the auxiliary longitudinal hinge hole and the auxiliary transverse hinge holes are arranged in the same plane;

the main longitudinal hinge hole and the auxiliary longitudinal hinge hole are hinged through a longitudinal hinge shaft, and the main transverse hinge holes and the auxiliary transverse hinge holes are hinged through a transverse hinge shaft; the transverse hinge shaft and the longitudinal hinge shaft form a crosswise structure and are in no contact at a center of the crosswise structure;

a limiting slot structure is further arranged on the main chain link of each chain link unit; the limiting slot structure comprises a transverse limiting slot arranged behind the main longitudinal hinge hole, and longitudinal limiting slots arranged in front of the main transverse hinge holes;

a limiting hole structure corresponding to the limiting slot structure is arranged on the auxiliary chain link; the limiting hole structure comprises a transverse limiting hole arranged behind the auxiliary longitudinal hinge hole, and longitudinal limiting holes arranged in front of the auxiliary transverse hinge holes;

the transverse limiting slot and the transverse limiting hole are connected through a longitudinal limiting pin for horizontal transverse limitation; the longitudinal limiting slots and the longitudinal limiting holes are connected through a transverse limiting pin for vertical longitudinal limitation; and the transverse limiting slot and the longitudinal limiting slots are both fan-shaped through slots.

2. The conveying apparatus according to claim 1, wherein anti-tilting wheels are arranged in a front-back staggered manner below the chain link units.

3. The conveying apparatus according to claim 1, wherein each transverse hinge shaft comprises two short transverse shafts, and each longitudinal hinge shaft penetrates through each chain link unit from top to bottom; and the guide wheel is arranged at a bottom of the longitudinal hinge shaft.

4. The conveying apparatus according to claim 1, wherein each support is formed by combining two half supports; one end of each half support of the support is fixedly connected to the main chain link of each chain link unit through a first side connecting plate, and another end is connected with a side protective cover through a second side connecting plate; and the locomotion wheels are mounted on an inner side of a bottom of the second side connecting plate.

5. The conveying apparatus according to claim 4, wherein the left and right first side connecting plates of the support are diagonally opposite to each other, one behind another; and anti-tilting wheels are arranged on outer sides of bottoms of the first side connecting plates, so that the two anti-tilting wheels are arranged in a front-back staggered manner below the chain link units.

6. The conveying apparatus according to claim 1, wherein a surface of each power roller is coated with rubber, and the power roller is of a conical structure having large diameters in two ends and a small diameter in the middle.

7. The conveying apparatus according to claim 1, wherein the guide wheels are provided with vertical U-shaped guide rails in a matched manner.

8. The conveying apparatus according to claim 7, wherein the locomotion wheels are provided with horizontal U-shaped guide rails in a matched manner.

* * * * *